United States Patent
Chen et al.

(10) Patent No.: US 7,948,574 B2
(45) Date of Patent: May 24, 2011

(54) BEZEL MADE OF TWO L-SHAPED AND TWO I-SHAPED BEZEL PARTS JOINED END TO END FOR ACCOMMODATING DISPLAY PANEL

(75) Inventors: I-Fee Chen, Miao-Li (TW); Rui-Ting Zheng, Miao-Li (TW); Xiao-Ming Cao, Shenzhen (CN); Chung-Shen Tang, Miao-Li (TW)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 761 days.

(21) Appl. No.: 11/978,469

(22) Filed: Oct. 29, 2007

(65) Prior Publication Data

US 2008/0100770 A1 May 1, 2008

(30) Foreign Application Priority Data

Oct. 27, 2006 (TW) ................................ 95139847 A (51) Int. Cl.
*G02F 1/1333* (2006.01)

(52) U.S. Cl. .............. 349/58; 349/59; 349/60; 361/681; 345/87

(58) Field of Classification Search .............. 349/58–60; 361/681; 345/87
See application file for complete search history.

(56) References Cited

U.S. PATENT DOCUMENTS

| 5,546,203 | A | * | 8/1996 | Takao | 349/62 |
| 6,512,326 | B1 | * | 1/2003 | Arai et al. | 313/407 |
| 6,870,582 | B2 | * | 3/2005 | Hayashimoto et al. | 349/58 |
| 7,025,489 | B2 | | 4/2006 | Lin et al. | |
| 7,520,655 | B2 | * | 4/2009 | Morishita | 362/632 |
| 2002/0191126 | A1 | * | 12/2002 | Sasuga et al. | 349/58 |
| 2004/0117004 | A1 | * | 6/2004 | Osborne et al. | 623/1.36 |
| 2004/0186558 | A1 | * | 9/2004 | Pavcnik et al. | 623/1.24 |
| 2005/0168954 | A1 | * | 8/2005 | Kim | 361/725 |
| 2005/0252148 | A1 | | 11/2005 | Lin et al. | |

FOREIGN PATENT DOCUMENTS

| CN | 1588188 A | | 3/2005 |
| JP | 04073714 A | * | 3/1992 |
| TW | M276429 U | | 9/2005 |
| TW | M288083 U | | 2/2006 |
| TW | I256027 B | | 6/2006 |
| TW | M295416 U | | 8/2006 |
| TW | 200636340 A | | 10/2006 |

* cited by examiner

*Primary Examiner* — Julie-Huyen L Ngo
(74) *Attorney, Agent, or Firm* — Wei Te Chung (57) ABSTRACT

An exemplary bezel includes two generally L-shaped bezel parts and two generally I-shaped bezel parts. All the bezel parts are joined end-to-end to cooperatively define a window therebetween, and this assembly is configured to accommodate a display panel. A minimum area of a rectangular region that can be occupied by the two generally L-shaped bezel parts alone includes a central unoccupied portion sufficient in size to accommodate the two generally I-shaped bezel parts.

8 Claims, 9 Drawing Sheets

BEZEL MADE OF TWO L-SHAPED AND TWO I-SHAPED BEZEL PARTS JOINED END TO END FOR ACCOMMODATING DISPLAY PANEL

CROSS-REFERENCE TO RELATED APPLICATION

This application is related to, and claims the benefit of, a foreign priority application filed in Taiwan as Application No. 95139847 on Oct. 27, 2006. The related application is incorporated herein by reference.

FIELD OF THE INVENTION

The present invention relates to bezels such as those used in liquid crystal displays (LCDs), and more particularly to a bezel for an LCD which includes at least two bezel parts.

GENERAL BACKGROUND

Liquid crystal displays are commonly used as display devices for compact electronic apparatuses, because they not only provide good quality images but are also very thin. Generally, a liquid crystal display includes a liquid crystal panel, a backlight module, and a bezel for accommodating the liquid crystal panel and the backlight module.

Figure 18:
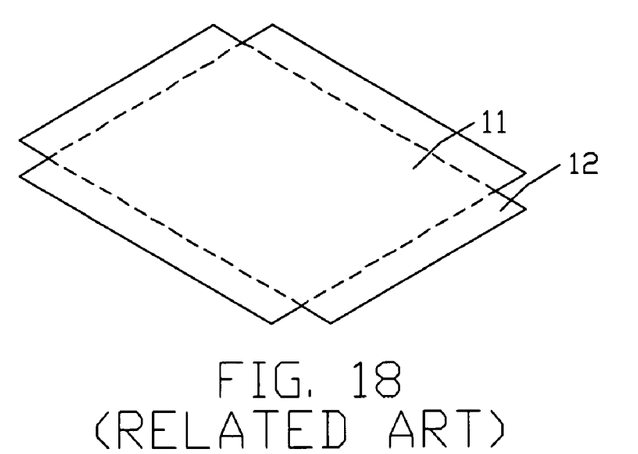
FIG. 18~FIG. 20 are isometric views showing successive stages in a process of fabricating a conventional bezel for a liquid crystal display.
Figure 19:
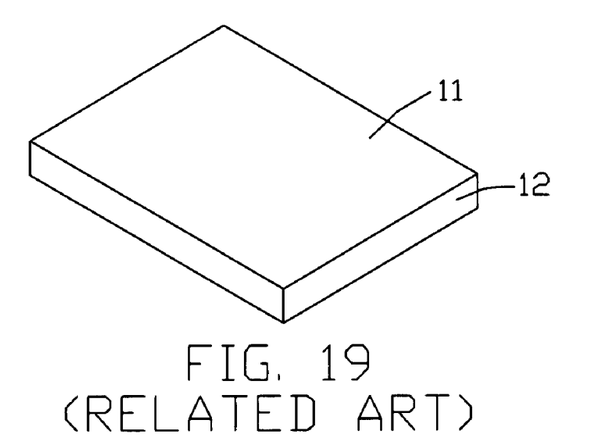
Figure 20:
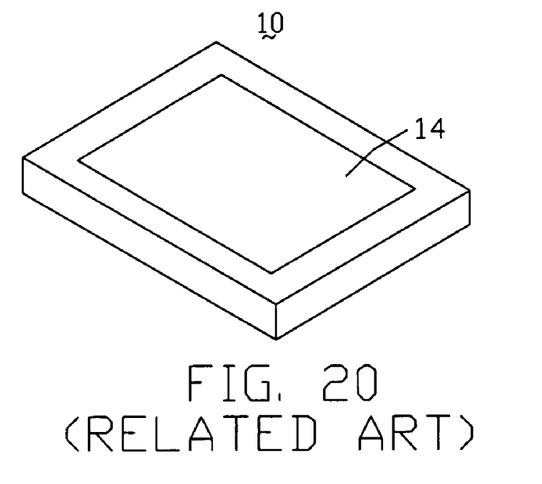

Referring to FIG. 18 through FIG. 20, a fabricating process of a typical bezel 10 for a liquid crystal display is shown. First, referring to FIG. 18, a rectangular metal piece 11 with four side metal pieces 12 is formed by cutting sheet metal. Second, referring to FIG. 19, the four side metal pieces 12 are folded in a direction vertical to the metal piece 11. Third, referring to FIG. 20, the metal piece 11 is punched, thereby forming a rectangular display window (not labeled) in a center area of the metal piece 11. Finally, junctions of the adjacent side metal pieces 12 are joined by a soldering process. Thus, the bezel 10 for the liquid crystal display is fabricated.

During the process of fabricating the bezel 10, a large portion of the sheet metal is removed from the metal piece 11 when the display window is formed. However, the removed metal portion generally cannot be used in further manufacture. Instead, the removed metal portion is typically consigned for recycling. Thus the cost of the bezel 10 is disproportionately high compared to the amount of sheet metal actually utilized in the bezel 10.

What is needed, therefore, is a bezel for a liquid crystal display which can overcome the above-described deficiencies.

SUMMARY

In one preferred embodiment, bezel includes two generally U-shaped bezel parts and two generally I-shaped bezel parts. Each of the generally U-shaped bezel parts includes a first bezel portion, a second bezel portion opposite to the first bezel portion and a third bezel portion between the first and second bezel portions. One of the generally I-shaped bezel parts is connected between the first bezel portions and the other one of the I-shaped bezel parts is connected between the second bezel portions.

Other aspects, novel features, and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred embodiments of the present invention in detail.

Figure 1:
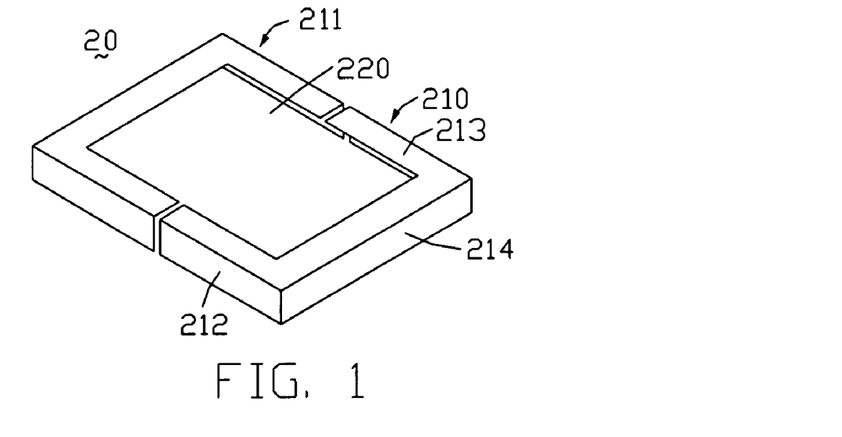
FIG. 1 is an unassembled, isometric view of a bezel for a liquid crystal display according to a first embodiment of the present invention.

Referring to FIG. 1, a bezel 20 for a liquid crystal display according to a first embodiment of the present invention is shown. The bezel 20 includes a first bezel part 210 and a second bezel part 211. The first and second bezel parts 210, 211 have a same generally U-shaped configuration. Each of the first and second bezel parts 210, 211 includes a first bezel portion 212, a second bezel portion 213, and a third bezel portion 214. The first, second, and third bezel portions 212, 213, 214 each have a horizontal wall (not labeled), and a vertical wall (not labeled) perpendicular to the horizontal wall. Each of the first and second bezel portions 212, 213 perpendicularly extends from a respective end portion (not labeled) of the third bezel portion 214. The first and second bezel portions 212, 213 have a same length. The first, second and third bezel portions 212, 213, 214 cooperatively form the U-shaped structure. The first bezel portion 212 of the first bezel part 210 is connected to the second bezel portion 213 of the second bezel part 211. The second bezel portion 213 of the first bezel part 210 is connected to the first bezel portion 212 of the second bezel part 211. The horizontal walls of the first, second and third bezel portions 212, 213, 214 are coplanar. A display window 220 is defined between the horizontal walls of the first, second and third bezel portions 212, 213, 214 of the first and second bezel parts 210, 211.

Figure 2:
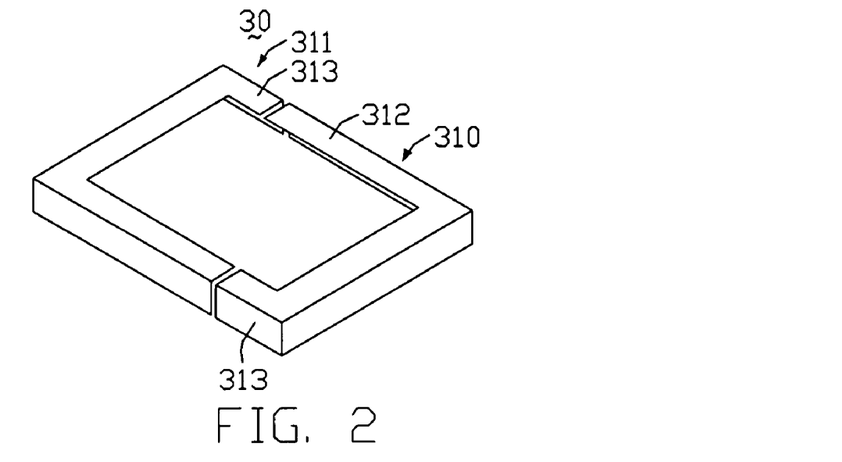
FIG. 2 is an unassembled, isometric view of a bezel for a liquid crystal display according to a second embodiment of the present invention.

Referring to FIG. 2, a bezel 30 for a liquid crystal display according to a second embodiment of the present invention is similar to the bezel 20. The bezel 30 includes a first generally U-shaped bezel part 310 and a second generally U-shaped bezel part 311. The first and second bezel parts 310, 311 have a same configuration. However, a length of a first bezel portion 312 of each of the first and second bezel parts 310, 311 is greater than a length of a second bezel portion 313 of each of the first and second bezel parts 310, 311.

Figure 3:
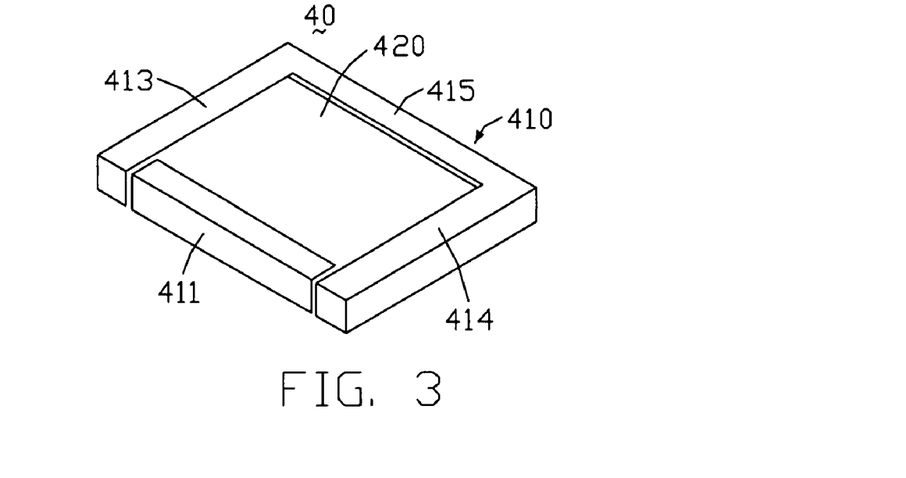
FIG. 3 is an unassembled, isometric view of a bezel for a liquid crystal display according to a third embodiment of the present invention.

Referring to FIG. 3, a bezel 40 for a liquid crystal display according to a third embodiment of the present invention is shown. The bezel 40 includes a first bezel part 410 and a second bezel part 411. The first bezel part 410 includes a first bezel portion 413, a second bezel portion 414; and a third bezel portion 415. The first, second, and third bezel portions 413, 414, 415 and the second bezel part 411 each have a horizontal wall (not labeled), and a vertical wall (not labeled) perpendicular to the horizontal wall. The first bezel portion 413 is opposite and parallel to the second bezel portion 414. The first and second bezel portions 413, 414 have a same length. The second bezel part 411 and the third bezel portion 415 have substantially a same length. Each of the first and second bezel portions 413, 414 perpendicularly extends from a respective end of the third bezel portion 415. The first, second, and third bezel portions 413, 414, 415 together constitute the U-shaped first bezel part 410. The second bezel part 411 is generally I-shaped. One end of the second bezel part 411 is connected to a free end of the first bezel portion 413, and an opposite end of the second bezel part 411 is connected to a free end of the second bezel portion 414. The horizontal walls of the first, second, and third bezel portions 413, 414, 415 and the second bezel part 411 are coplanar. A display window 420 is defined between the horizontal walls of the first, second, and third bezel portions 413, 414, 415 and the second bezel part 411.

Figure 4:
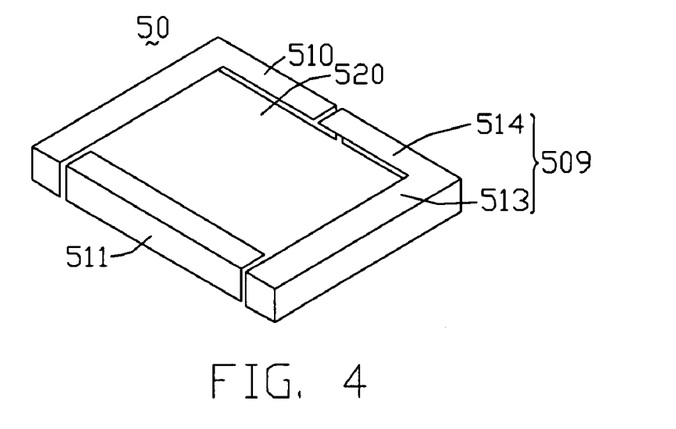
FIG. 4 is an unassembled, isometric view of a bezel for a liquid crystal display according to a fourth embodiment of the present invention.

Referring to FIG. 4, a bezel 50 for a liquid crystal display according to a fourth embodiment of the present invention is shown. The bezel 50 includes a first bezel part 509, a second bezel part 510, and a third bezel part 511. The first and second bezel parts 509, 510 have substantially the same configuration, except that they are mirror images of each other. Each of the first and second bezel parts 509, 510 is generally L-shaped. The third bezel part 511 is generally I-shaped. Each of the first and second bezel parts 509, 510 includes a first bezel portion 513 and a second bezel portion 514. A length of the third bezel part 511 is substantially the same as a combined length of the two second bezel portions 514 of the first and second bezel parts 509, 510. The first and second bezel portions 513, 514 and the third bezel part 511 each have a horizontal wall (not labeled) and a vertical wall (not labeled) perpendicular to the horizontal wall. The first bezel portion 513 perpendicularly extends from the second bezel portion 514. One end of the third bezel part 511 is connected to the first bezel part 509, and an opposite end of the third bezel part 511 is connected to the second bezel part 510. The horizontal walls of the first and second bezel portions 513, 514 and the third bezel part 511 are coplanar. A display window 520 is defined between the horizontal walls of the first and second bezel portions 513, 514 and the third bezel part 511.

Figure 5:
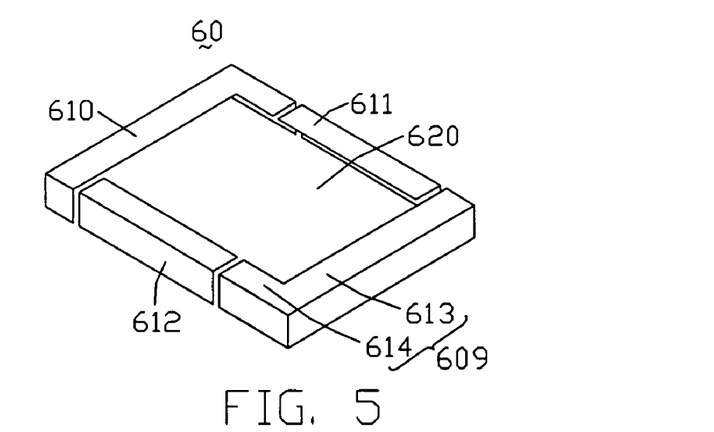
FIG. 5 is an unassembled, isometric view of a bezel for a liquid crystal display according to a fifth embodiment of the present invention.

Referring to FIG. 5, a bezel 60 for a liquid crystal display according to a fifth embodiment of the present invention is shown. The bezel 60 includes a first bezel part 609, a second bezel part 610, a third bezel part 611, and a fourth bezel part 612. The first bezel part 609 and the second bezel part 610 have a same structure. Each of the first and second bezel parts 609, 610 includes a first bezel portion 613, and a second bezel portion 614 perpendicularly extending from the first bezel portion 613. Thus, the first and second bezel parts 609, 610 are generally L-shaped. The third and fourth bezel parts 611, 612 are generally I-shaped. The third and fourth bezel parts 611, 612 have a same length. The first, second, third and fourth bezel parts 609, 610, 611, 612 each have a horizontal wall (not labeled) and a vertical wall (not labeled) perpendicular to the horizontal wall. One end of the third bezel part 611 is connected to the first bezel portion 613 of the first bezel part 609, and an opposite end of the third bezel part 611 is connected to the second bezel portion 614 of the second bezel part 610. One end of the fourth bezel part 612 is connected to the second bezel portion 614 of the first bezel part 609, and an opposite end of the fourth bezel part 612 is connected to the first bezel portion 613 of the second bezel part 610. The horizontal walls of the first, second, third, and fourth bezel parts 609, 610, 611, 612 are coplanar. A display window 620 is defined between the horizontal walls of the first, second, third, and fourth bezel parts 609, 610, 611, 612.

Figure 6:
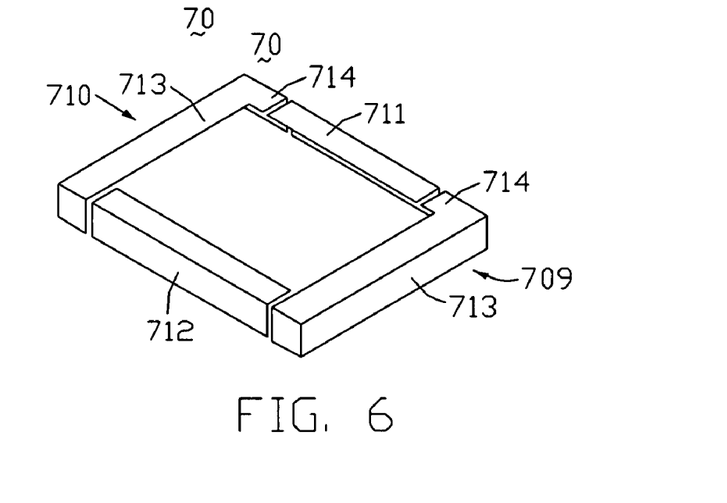
FIG. 6 is an unassembled, isometric view of a bezel for a liquid crystal display according to a sixth embodiment of the present invention.

Referring to FIG. 6, a bezel 70 for a liquid crystal display according to a sixth embodiment of the present invention is shown. The bezel 70 is similar to the bezel 60 of the fifth embodiment. However, a length of a generally I-shaped third bezel part 711 is less than a length of a generally I-shaped fourth bezel part 712. One end of the third bezel part 711 is connected to a second bezel portion 714 of a generally L-shaped first bezel part 709. An opposite end of the third bezel part 711 is connected to the second bezel portion 714 of a generally L-shaped second bezel part 710. One end of the fourth bezel part 712 is connected to a first bezel portion 713 of the first bezel part 709. An opposite end of the fourth bezel part 712 is connected to the first bezel portion 713 of the second bezel part 710.

Figure 7:
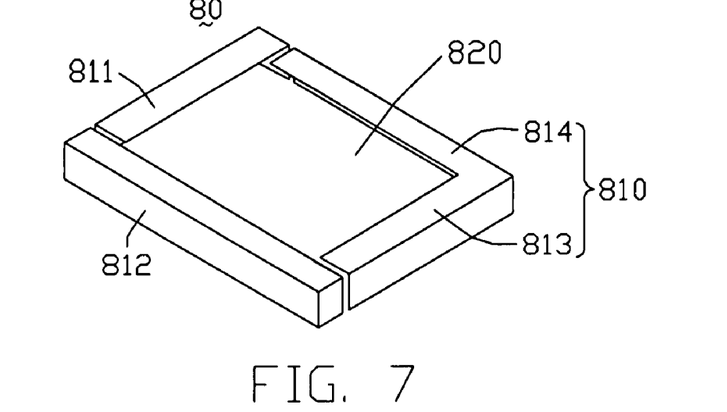
FIG. 7 is an unassembled, isometric view of a bezel for a liquid crystal display according to a seventh embodiment of the present invention.

Referring to FIG. 7, a bezel 80 for a liquid crystal display according to a seventh embodiment of the present invention is shown. The bezel 80 includes a first bezel part 810, a second bezel part 811, and a third bezel part 812. The first bezel part 810 includes a first bezel portion 813 and a second bezel portion 814. The first bezel portion 813 perpendicularly extends from the second bezel portion 814. Thus, the first bezel part 810 has a generally L-shaped structure. The second and third bezel parts 811, 812 are generally I-shaped. A length of the second bezel part 811 is the same as a length of the first bezel portion 813. A length of the third bezel part 812 is a little greater than a length of the second bezel portion 814. The first, second and third bezel parts 810, 811, 812 each have a horizontal wall (not labeled), and a vertical wall (not labeled) perpendicular to the horizontal wall. The horizontal walls of the first, second and third bezel parts 810, 811, 812 are coplanar. A display window 820 is defined between the horizontal walls of the first, second and third bezel parts 810, 811, 812. The first, second and third bezel parts 810, 811, 812 arranged end-to-end in that sequence constitute the bezel 80.

Figure 8:
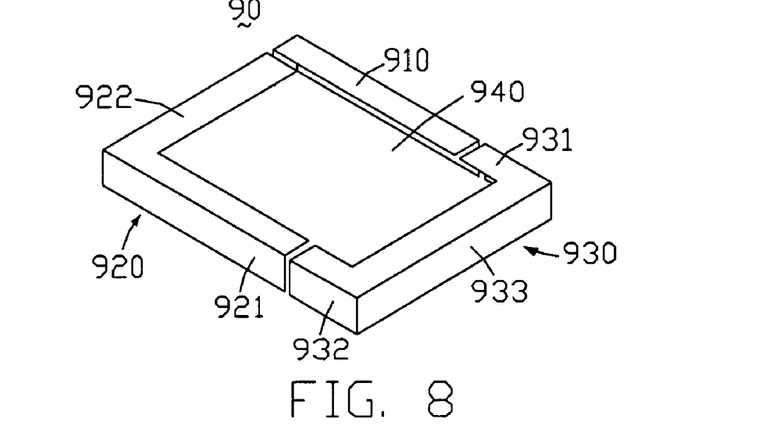
FIG. 8 is an unassembled, isometric view of a bezel for a liquid crystal display according to an eighth embodiment of the present invention.

Referring to FIG. 8, a bezel 90 for a liquid crystal display according to an eighth embodiment of the present invention is shown. The bezel 90 includes a first bezel part 910, a second bezel part 920, and a third bezel part 930. The first bezel part 910 is generally I-shaped. The second bezel part 920 is generally L-shaped. The third bezel part 930 is generally U-shaped. The first, second and third bezel parts 910, 920, 930 each have a horizontal wall (not labeled), and a vertical wall (not labeled) perpendicular to the horizontal wall. The second bezel part 920 includes a first bezel portion 921 and a second bezel portion 922. The first bezel portion 921 perpendicularly extends from the second bezel portion 922. The third bezel part 930 includes a third bezel portion 931, a fourth bezel portion 932, and a fifth bezel portion 933. Each of the third bezel portion 931 and the fourth bezel portion 932 perpendicularly extends from a respective end of the fifth bezel portion 933. The horizontal walls of the first, second and third bezel parts 910, 920, 930 are coplanar. A display window 940 is defined between the horizontal walls of the first, second and third bezel parts 910, 920, 930. The first, second and third bezel parts 910, 920, 930 arranged end-to-end in that sequence constitute the bezel 90.

Figure 9:
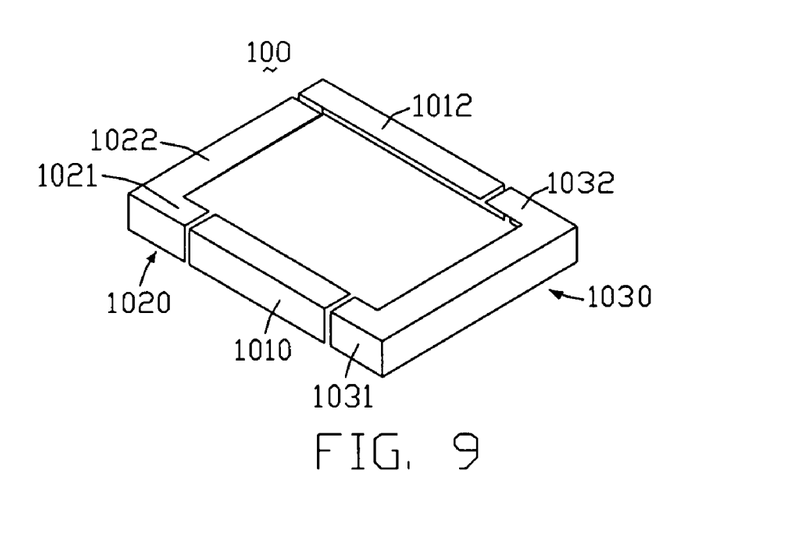
FIG. 9 is an unassembled, isometric view of a bezel for a liquid crystal display according to a ninth embodiment of the present invention.

Referring to FIG. 9, a bezel 100 for a liquid crystal display according to a ninth embodiment of the present invention is shown. The bezel 100 is similar to the bezel 90. However, the bezel 100 includes a fourth bezel part 1010. The fourth bezel part 1010 has a generally I-shaped structure. A length of the fourth bezel part 1010 is less than a length of a third bezel part 1012. The fourth bezel part 1010 is connected between a first bezel portion 1021 of a first bezel part 1020 and a third bezel portion 1031 of a third bezel part 1030. The first bezel part 1020 also includes a second bezel portion 1022. The third bezel part 1030 also includes a fourth bezel portion 1032.

The bezel parts of the above-described bezels are engaged together by a laser soldering process. The shapes of the engaging surfaces of the bezel parts can be straight, slanted, saw-toothed, wavy, concave, or convex.

Because the above-described bezels are formed by connecting two or more bezel parts together, unlike in conventional manufacturing, there is no need to punch a large portion of sheet metal in order to form a display window. A substantial proportion or even all of a piece of sheet metal can be utilized in manufacturing the bezel parts. The total amount of sheet metal needed is reduced, with little or no surplus sheet metal being consigned for recycling. Thus, the cost of manufacturing the bezels can be reduced.

Figure 10:
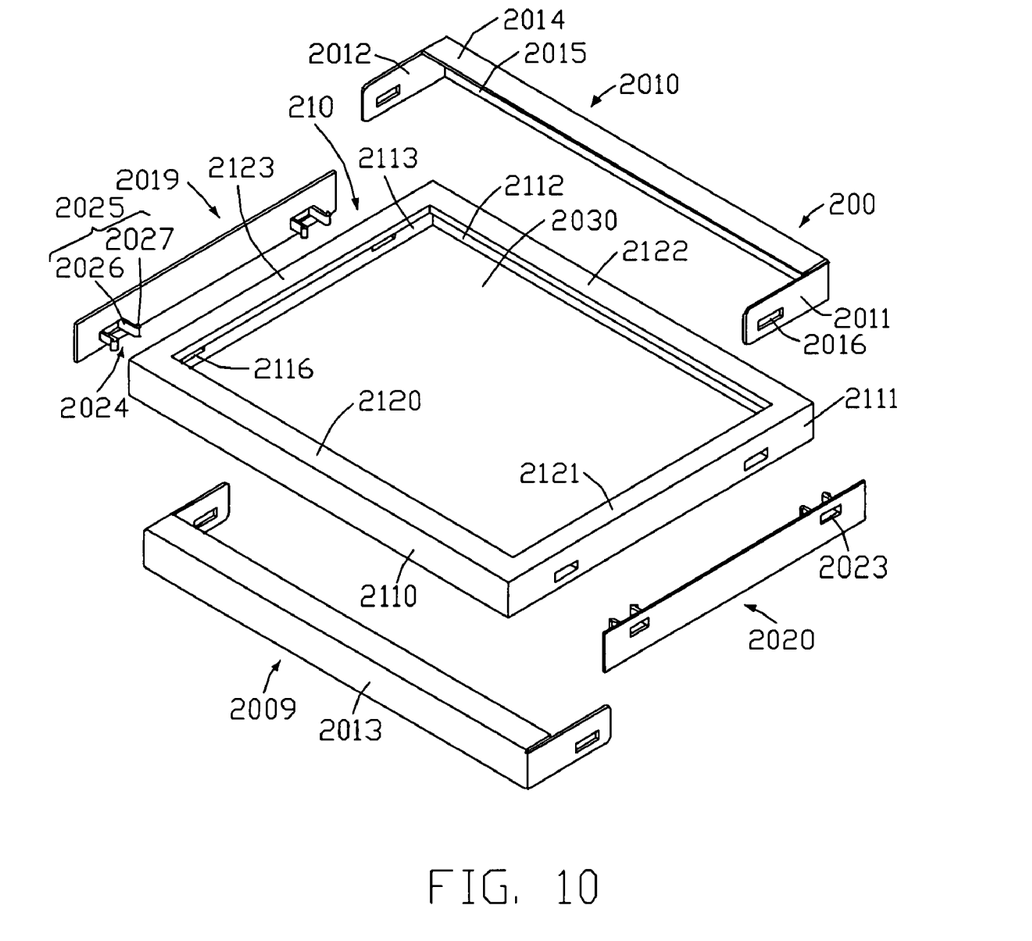
FIG. 10 is an exploded, isometric view of a bezel for a liquid crystal display according to a tenth embodiment of the present invention, also showing a frame of the liquid crystal display.

Referring to FIG. 10, a bezel 200 for a liquid crystal display according to a tenth embodiment of the present invention is shown, together with a frame 210 of the liquid crystal display.

The bezel 200 includes a pair of generally U-shaped bezel parts 2009, 2010, and a pair of generally I-shaped bezel parts 2019, 2020. The two U-shaped bezel parts 2009, 2010 are oriented symmetrically opposite to each other. The two I-shaped bezel parts 2019, 2020 are oriented symmetrically opposite to each other. Each of the U-shaped bezel parts 2009, 2010 includes a first bezel portion 2011, a second bezel portion 2012, and a third bezel portion 2013. The third bezel portion 2013 has a horizontal wall 2014, and a vertical wall 2015 perpendicular to the horizontal wall 2014. The first and second bezel portions 2011, 2012 perpendicularly extend from opposite ends of the third bezel portion 2013, respectively. In particular, the first and second bezel portions 2011, 2012 perpendicularly extend from the vertical wall 2015 of the third bezel portion 2013. Each of the first and second bezel portions 2011, 2012 defines a first through hole 2016 therein.

Each of the I-shaped bezel parts 2019, 2020 includes a pair of fixing mechanisms 2024, and defines a pair of second through holes 2023. Each of the fixing mechanisms 2024 extends inward from opposite edges of a respective one of the second through holes 2023. Each fixing mechanism 2024 includes a pair of hooks 2025 extending inward from opposite sides of the respective second through hole 2023. The hooks 2025 each include a straight portion 2026 extending perpendicularly from a main body of the I-shaped bezel part 2019, and a bent portion 2027 obliquely bent more than 900 from a distal end of the straight portion 2026. The bent portions 2027 of the fixing mechanism 2024 are oriented symmetrically opposite to each other. A width of each of the second through holes 2023 is slightly less than a width of each of the first through holes 2016. The fixing mechanisms 2024 are made from flexible material which can elastically deform and rebound to its original state; for example, plastic or metal.

The frame 210 includes four top surfaces 2120, 2121, 2122, 2123 connected in sequence and four side surfaces 2110, 2111, 2112, 2113 perpendicularly connected to the four top surfaces 2120, 2121, 2122, 2123. A window 2030 is defined between the four top surfaces 2120, 2121, 2122, 2123. The side surfaces 2111, 2113 each define a pair of third through holes 2116 therein. Each of the third through holes 2116 corresponds to a respective fixing mechanism 2024.

Figure 11:
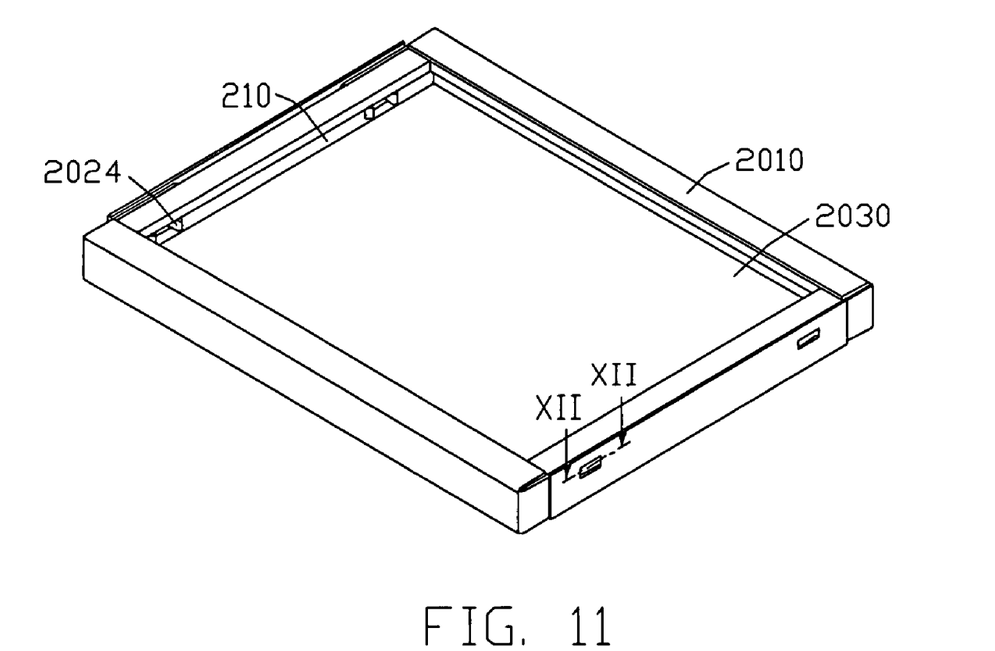
FIG. 11 is an assembled view of the bezel and the frame of FIG. 10.
Figure 12:
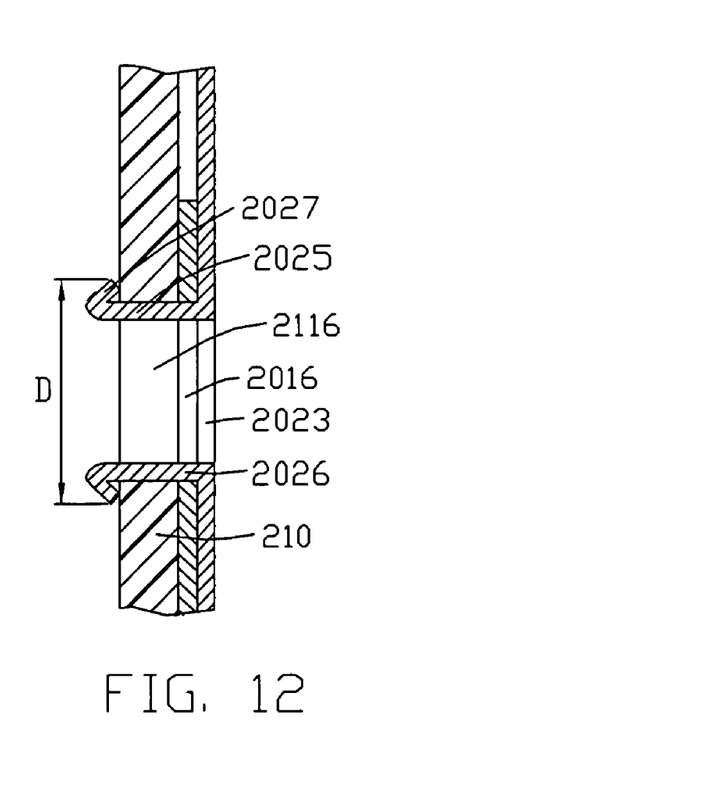
FIG. 12 is a cross-sectional view taken along line XII-XII of FIG. 11.

Referring to FIG. 11, this shows the bezel 200 and frame 210 assembled together. Referring also to FIG. 12, a largest width spanned by a pair of bent portions 2027 is defined as "D". The width "D" is larger than the width of the third through hole 2116. The U-shaped bezel parts 2009, 2010 cover the frame 210. The first through holes 2016 correspond in position to the third through holes 2116. The hooks 2025 are inserted through the first and third through holes 2016, 2023, so that the fixing mechanisms 2024 of the I-shaped bezel parts 2019, 2020 buckle the U-shaped bezel parts 2009, 2010 to the frame 210. Thus, the bezel 200 and the frame 210 are fixed together.

Figure 13:
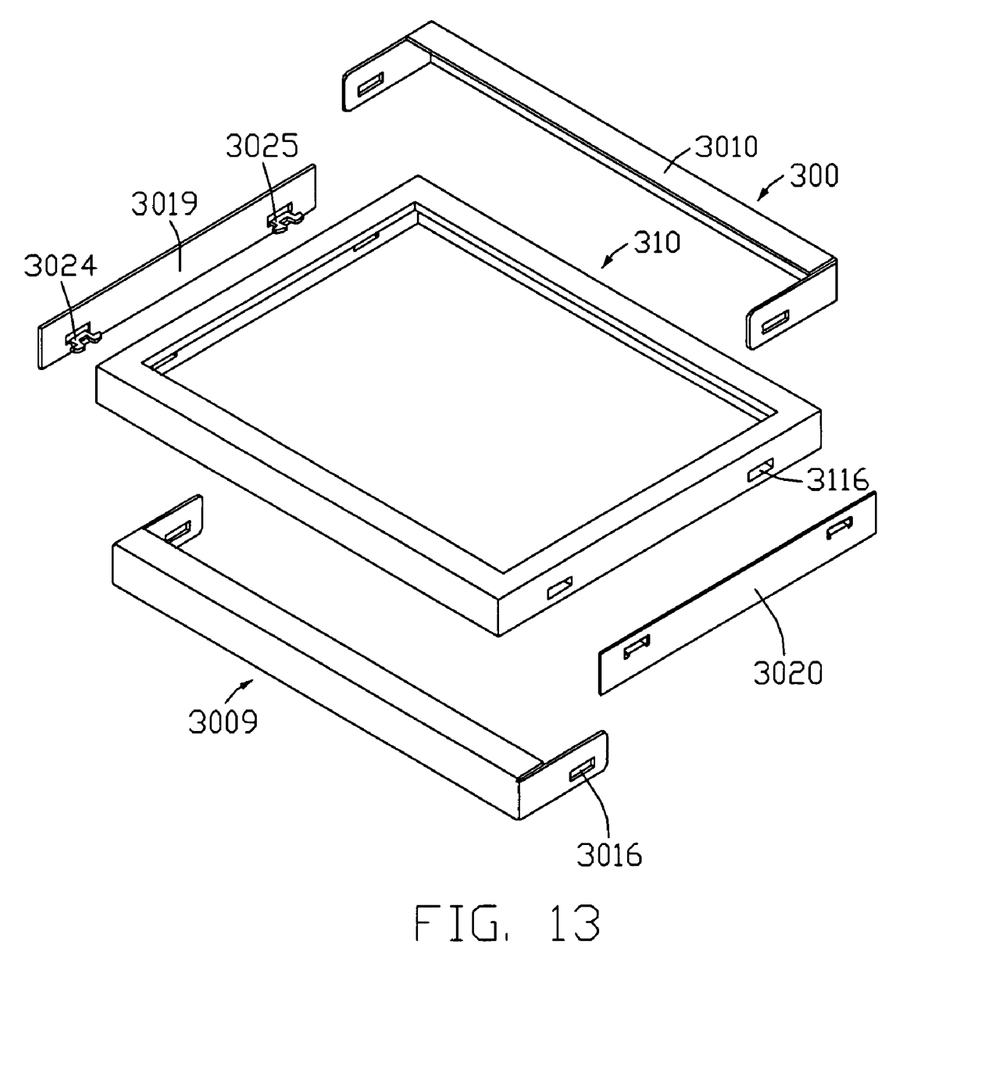
FIG. 13 is an exploded, isometric view of a bezel for a liquid crystal display according to an eleventh embodiment of the present invention, also showing a frame of the liquid crystal display.

Referring to FIG. 13, a bezel 300 for a liquid crystal display according to an eleventh embodiment of the present invention is shown, and a frame 310 corresponding to the bezel 300 is also shown. The bezel 300 is similar to the bezel 200. However, each of fixing mechanisms 3024 has a generally U-shaped structure. The fixing mechanism 3024 includes a pair of coplanar hooks 3025. Each hook 3025 has a straight portion 3026, and a bent portion 3027 extending from a distal end of the straight portion 3026. The hooks 3025 are made from flexible material which can elastically deform and rebound to its original state; for example, plastic or metal. A width of each of first through holes 3016 is slightly greater than a width of each of second through holes (not labeled).

Figure 14:
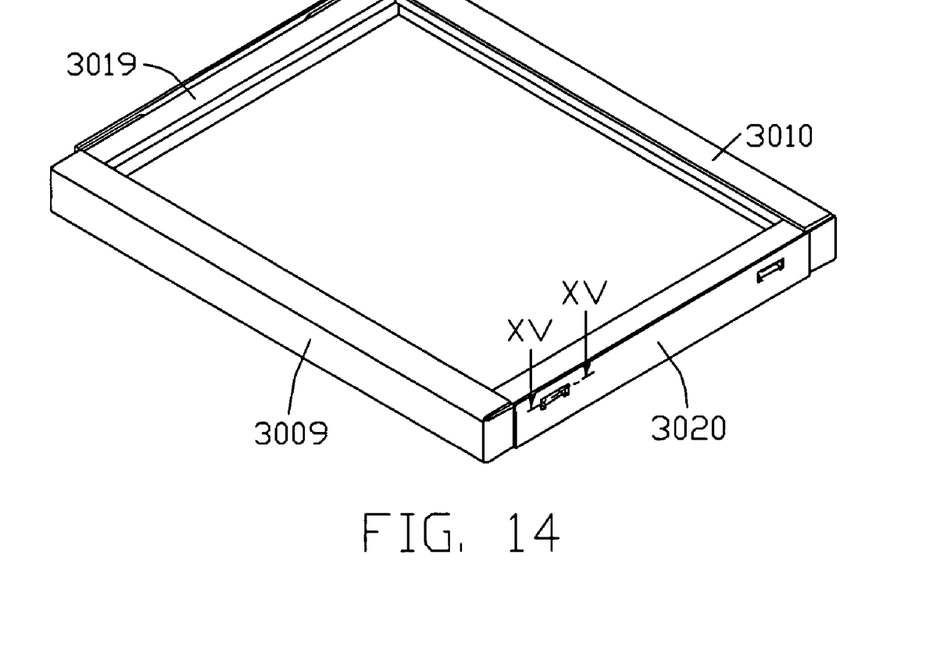
FIG. 14 is an assembled view of the bezel and the frame of FIG. 13.
Figure 15:
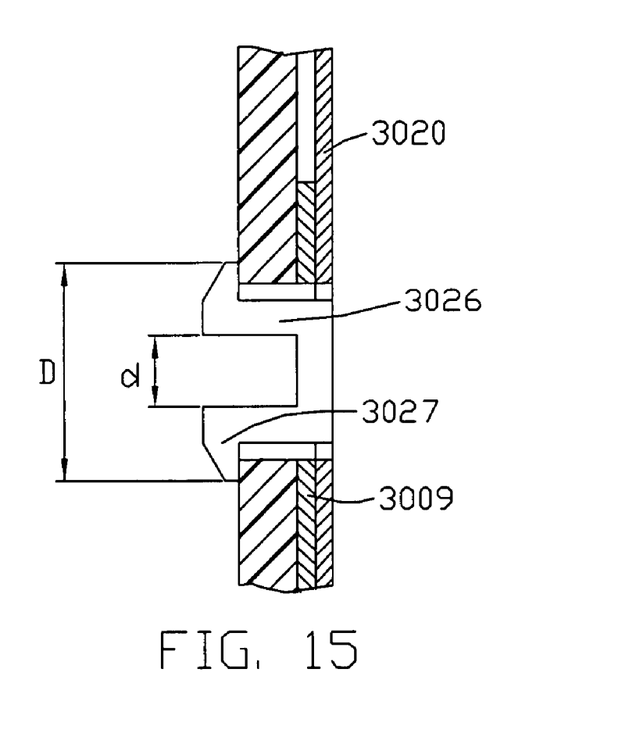
FIG. 15 is a cross-sectional view taken along line XV-XV of FIG. 14.

Referring to FIG. 14, this shows the bezel 300 and the frame 310 assembled together. Referring also to FIG. 15, a largest width spanned by the bent portions 3027 is defined as "D", and a distance separating the straight portions 3026 is defined as "d". The width "D" is larger than the distance "d". The width "D" is a little larger than the width of the first through hole 3016. Therefore the two bent portions 3027 can elastically deform toward each other when the hooks 3025 are inserted through the first through hole 3016. Thus when the pair of hooks 3025 elastically rebound, the bent portions 3027 are buckling onto the frame 310. Thereby, the bezel 300 and the frame 310 are fixed together by the fixing mechanisms 3024.

Because the bezel 200 is made up of four bezel parts 2009, 2010, 2019, 2020, and the bezel 300 is made up of four bezel parts 3009, 3010, 3019, 3020, a single piece of sheet metal can used to make a bezel by cutting a plurality of various shapes from the sheet metal, the shapes corresponding to the various bezel parts.

Figure 16:
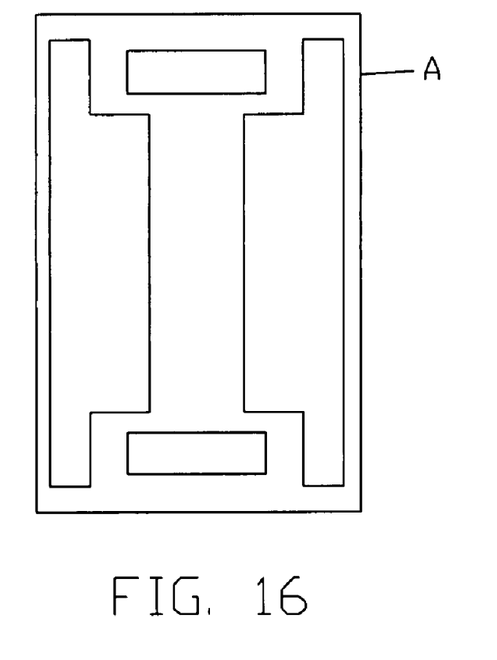
FIG. 16 is a top plan view of a piece of sheet metal, showing a cutting layout for obtaining the bezel according to the tenth embodiment of the present invention.
Figure 17:
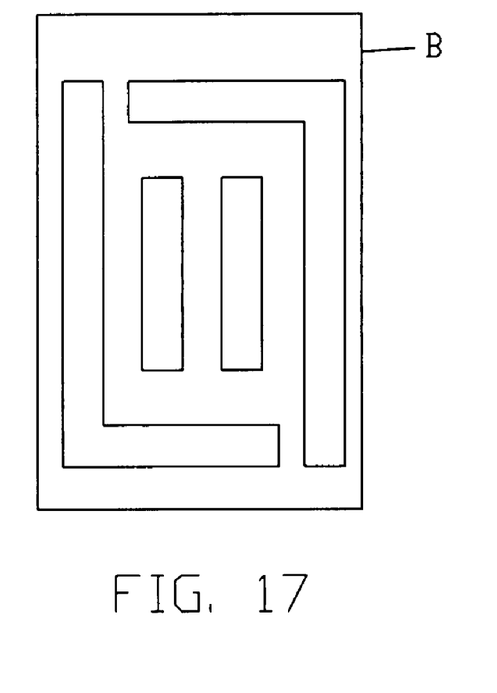
FIG. 17 is a top plan view of another piece of sheet metal, showing a cutting layout for obtaining the bezel according to the fifth or sixth embodiments of the present invention.

Referring to FIG. 16, a piece of sheet metal denoted as "A" can be cut and punched into two generally T-shaped metal parts and two generally I-shaped metal parts. Referring to FIG. 17, a metal piece denoted as "B" can be cut and punched into two generally L-shape metal parts and two generally I-shaped metal parts. The metal parts can be further machined (e.g. by bending, punching, stamping, etc.) to make the corresponding finished bezel parts. A substantial proportion of each piece of sheet metal A, B is utilized in fabricating the bezel parts. The total amount of sheet metal needed is reduced, with little surplus sheet metal being consigned for recycling. Thus, the cost of manufacturing the bezel parts can be reduced.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A bezel comprising:
a plurality of bezel parts, the bezel parts comprising two generally L-shaped bezel parts and two generally I-shaped bezel parts, all the bezel parts joined end-to-end to cooperatively define a window therebetween and configured to accommodate a display panel, wherein a minimum area of a rectangular region that can be occupied by the two generally L-shaped bezel parts alone comprises a central unoccupied portion sufficient in size to accommodate the two generally I-shaped bezel parts.

2. The bezel in claim 1, wherein each of the generally I-shaped bezel parts comprises a horizontal wall and a vertical wall perpendicular to the horizontal wall.

3. The bezel in claim 1, wherein the two generally I-shaped bezel parts have a same length.

4. The bezel in claim 1, wherein the bezel parts are laser soldered together.

5. The bezel in claim 1, wherein the two generally L-shaped bezel parts and the two generally I-shaped bezel parts are made from a rectangular metal sheet.

6. The bezel in claim 1, wherein each of the two generally L-shaped bezel parts comprises only one right-angle bent portion in a same horizontal surface.

7. The bezel in claim 1, wherein each of the two generally L-shaped bezel parts and the two generally I-shaped bezel parts is a main body of the bezel.

8. The bezel in claim 1, wherein each generally I-shaped bezel part is located between a strip portion of one of the two generally L-shaped bezel parts and a strip portion of the other generally L-shaped bezel part, and the two strip portions of the two generally L-shaped bezel parts are perpendicular to each other.

* * * * *